United States Patent
Nam et al.

(10) Patent No.: US 10,185,414 B2
(45) Date of Patent: Jan. 22, 2019

(54) SMART WATCH AND METHOD OF OPERATING

(71) Applicant: SAMSUNG DISPLAY CO., LTD., Yongin-si, Gyeonggi-do (KR)

(72) Inventors: Hui Nam, Yongin-si (KR); Myung Ho Lee, Yongin-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 93 days.

(21) Appl. No.: 15/190,274

(22) Filed: Jun. 23, 2016

(65) Prior Publication Data

US 2017/0153719 A1    Jun. 1, 2017

(30) Foreign Application Priority Data

Dec. 1, 2015 (KR) .................. 10-2015-0169893

(51) Int. Cl.
| | | |
|---|---|---|
| *G04G 17/04* | (2006.01) | |
| *G06F 3/0362* | (2013.01) | |
| *G04G 17/08* | (2006.01) | |
| *G04G 21/02* | (2010.01) | |
| *G06F 1/16* | (2006.01) | |
| *G04C 17/00* | (2006.01) | |
| *G04G 9/00* | (2006.01) | |
| *G04C 3/00* | (2006.01) | |

(52) U.S. Cl.
CPC .......... *G06F 3/0362* (2013.01); *G04C 3/001* (2013.01); *G04C 17/0091* (2013.01); *G04G 9/0082* (2013.01); *G04G 17/045* (2013.01); *G04G 17/08* (2013.01); *G04G 21/02* (2013.01); *G06F 1/163* (2013.01); *G06F 1/1694* (2013.01); *G06F 2200/1614* (2013.01)

(58) Field of Classification Search
None
See application file for complete search history.

(56) References Cited

U.S. PATENT DOCUMENTS

2016/0379604 A1* 12/2016 Komulainen ........ G04G 17/045
                                                              345/658

FOREIGN PATENT DOCUMENTS

| KR | 10-2004-0037369 A | 5/2004 |
|---|---|---|
| KR | 10-0555672 B1 | 3/2006 |

\* cited by examiner

*Primary Examiner* — Brian Butcher
(74) *Attorney, Agent, or Firm* — Lee & Morse, P.C.

(57) ABSTRACT

Disclosed is a smart watch which may comprise: a display unit including a display panel displaying an image and a panel frame supporting the display panel; a rotating member including a rotating plate provided with recesses on an outer peripheral surface of the rotating plate, a rotating shaft having one end connected to a center of the rotating plate to rotate the rotating plate, and a driving motor coupled with the other end of the rotating shaft; a control unit to control the display unit and the rotating member; and a support frame to support the display unit and accommodate the rotating member and the control unit.

12 Claims, 5 Drawing Sheets

SMART WATCH AND METHOD OF OPERATING

CROSS-REFERENCE TO RELATED APPLICATION

Korean Patent Application No. 10-2015-0169893, filed on Dec. 1, 2015, in the Korean Intellectual Property Office, and entitled: "Smart Watch and Method of Operating," is incorporated by reference herein in its entirety.

BACKGROUND

1. Field

Exemplary embodiments relate to a smart watch and a method of operating.

2. Description of the Related Art

A user may conveniently use a mobile device, such as a smart phone and a tablet PC, by using a finger or a touch pen. The mobile device may need to be put into a pocket or a bag or held with a hand, and carrying the mobile device may feel inconvenient to a user.

However, a user may wear a smart watch like a wrist watch, which may have better portability than the mobile device.

SUMMARY

Exemplary embodiments may provide a smart watch, comprising: a display unit including a display panel displaying an image and a panel frame supporting the display panel; a rotating member including a rotating plate provided with recesses on an outer peripheral surface of the rotating plate, a rotating shaft having one end connected to a center of the rotating plate to rotate the rotating plate, and a driving motor coupled with the other end of the rotating shaft; a control unit to control the display unit and the rotating member; and a support frame to support the display unit and accommodate the rotating member and the control unit. The panel frame may include an upper frame and a lower frame supporting the display panel at upper and lower sides of the display panel, a connecting frame connecting the upper frame and the lower frame, and a plurality of protrusions on a lower surface of the lower frame and gear-coupled with the recesses. The display panel may be inserted into and fixed to a groove formed by an inner surface of the connecting frame, the upper frame and the lower frame. The support frame may include a bottom surface, a lateral surface extended from the bottom surface and to an upper side, and an upper surface extended from the lateral surface and in parallel with the bottom surface, the rotating member and the control unit are located on the bottom surface, and the upper surface is inserted into a guide recess formed by an external surface of the connecting frame, the upper frame, and the lower frame.

The display panel may have a circular shape.

The upper frame, the lower frame, and the connecting frame have ring-shapes, diameters of outer circumferences of the upper frame and the lower frame may be larger than a diameter of an outer circumference of the connecting frame, and diameters of inner circumferences of the upper frame and the lower frame may be smaller than a diameter of an inner circumference of the connecting frame.

The smart watch may further include: a first reference point on an exposed surface of the upper frame; and a second reference point on an exposed surface of the upper surface.

The first and second reference points may be for determining a reference position of the display unit.

The smart watch may further include a sensor unit to sense a rotation of the display unit.

The sensor unit may generate a rotation sensing signal by sensing a rotation of the driving motor and transmitting the rotation sensing signal to the control unit. The sensor unit may sense a rotation quantity of the driving motor and transmit the rotation quantity of the driving motor to the control unit, and the control unit may convert the rotation quantity of the driving motor into a rotation quantity of the display unit.

When the first reference point is spaced apart from a line connecting a center of the display panel to the second reference point, the sensor unit may generate a rotation sensing signal and transmits the rotation sensing signal to the control unit. The sensor unit may transmit an angle between a line connecting the center of the display panel to the first reference point and the line connecting the center of the display panel to the second reference point to the control unit as a rotation quantity of the display unit.

The display panel may be in an always-on state.

Exemplary embodiments may also provide a method of preventing a smart watch from being degraded, comprising: determining a degradation preventing mode of a display unit, the display unit displaying an image including first information describing an hour marker position of each hour and second information describing positions of an hour hand and a minute hand of a current time; rotating the first information in the degradation preventing mode; and displaying the image, in which the first information is rotated, on the display unit.

The method may further include determining a rotation of the display unit before rotating the first information. The method may further include measuring a rotation quantity of the display unit when the display unit is rotated.

In the rotating the first information, the first information may be rotated in an opposite direction to a rotation direction of the display unit by the rotation quantity of the display unit.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
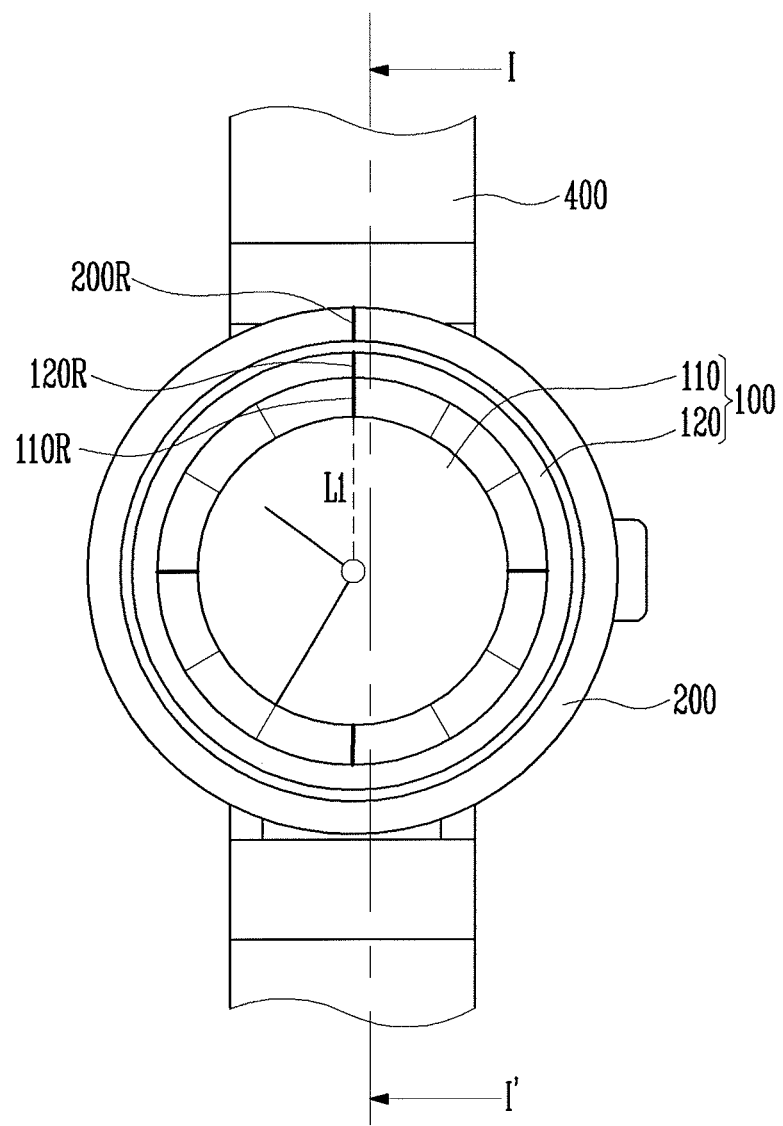
FIG. 1 illustrates a top plan view for describing a smart watch according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. It will also be understood that when an element is referred to as "bent," this expression does not limit the configuration to an element formed or shaped by a bending process, but includes any such angled, curved, or similarly shaped configuration created by any suitable process. Like reference numerals refer to like elements throughout.

Figure 2:
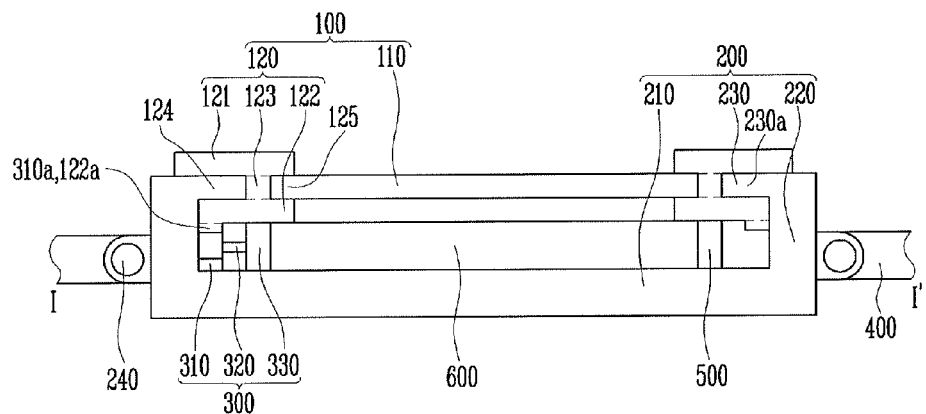
FIG. 2 illustrates a cross-sectional view taken along line I-I' of FIG. 1.
Figure 3:
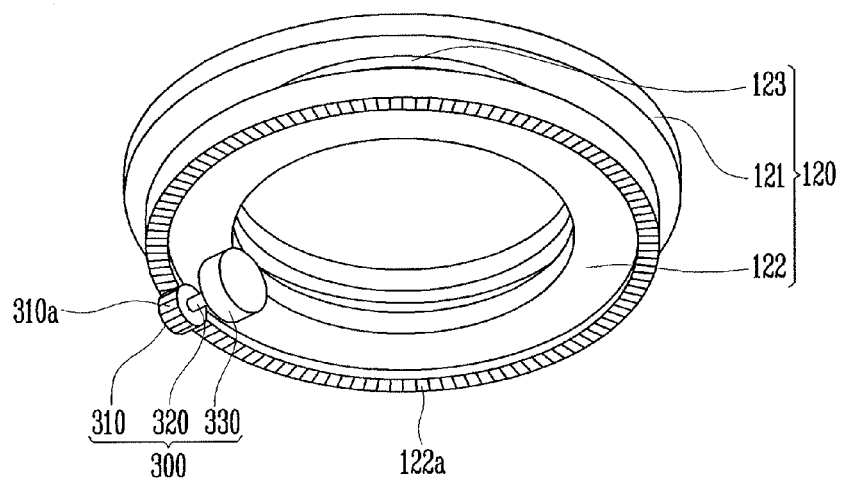
FIG. 3 illustrates a down-directional perspective view for describing a panel frame and a rotating member of FIGS. 1 and 2.

FIG. 1 is a top plan view for describing a smart watch according to an exemplary embodiment, FIG. 2 is a cross-sectional view taken along line I-I' of FIG. 1, and FIG. 3 is a down-directional perspective view for describing a panel frame and a rotating member of FIGS. 1 and 2.

Referring to FIGS. 1 to 3, the smart watch may display an image according to a selection of a user or a wireless signal of an external device. The external device may be a mobile device, such as a smart phone or a tablet PC, and may be communicate with the smart watch.

The smart watch may include a display unit 100 displaying the image, a support frame 200 supporting the display unit 100, a rotating member 300 rotating the display unit 100, a band member 400 connected with the support frame 200, a sensor unit 500 sensing a rotation of the display unit 100, and a control unit 600 controlling the display unit 100 and the rotating member 300.

The display unit 100 may include a display panel 110 displaying the image, and a panel frame 120 fixing the display panel 110 and coupling the display panel 110 with the support frame 200. Further, the display unit 100 may further include a touch panel disposed on an external, exposed surface of the display panel 110.

The display panel 110 may have a shape corresponding to an exterior appearance of the smart watch. For example, when the smart watch has a circular watch shape, the display panel 110 may have a circular shape.

The display panel 110 may include, for example, a self-emitting display panel, such as an Organic Light Emitting Display (OLED) panel, may be used as the display panel 110. Further, a non-emission display panel, such as a Liquid Crystal Display (LCD) panel, an Electro-Phoretic Display (EPD) panel, and an Electro-Wetting Display (EWD) panel, may be used as the display panel 110. When the non-emission display panel is used as the display panel 110, the display unit 100 may also include a backlight unit for supplying light to the display panel 110. Exemplary embodiments will be described as having the OLED panel as the display panel 110, for example only.

The display panel 110 may include a thin film transistor substrate, an organic light emitting device disposed on the thin film transistor substrate, and an encapsulating member isolating the organic light emitting device from an external environment.

The thin film transistor substrate may include a base substrate including a plurality of pixel areas, and at least one thin film transistor disposed in each pixel area on the base substrate.

The organic light emitting device may be disposed in the pixel area, and may be connected to the thin film transistor. The organic light emitting device may include a first electrode connected to the thin film transistor, an organic layer disposed on the first electrode, and a second electrode disposed on the organic layer. One of the first electrode and the second electrode may be an anode electrode and the other may be a cathode electrode. For example, the first electrode may be an anode electrode, and the second electrode may be a cathode electrode. Further, at least one of the first electrode and the second electrode may be a transmissive electrode.

The encapsulating member may isolate the organic light emitting device from an external environment. Further, the encapsulating member may be disposed on the second electrode, and prevent moisture and oxygen from permeating into the organic light emitting device.

The encapsulating member may be a plurality of inorganic layers and an encapsulating layer including the plurality of inorganic layers. Further, the encapsulating member may be an opposite substrate facing the thin film transistor substrate. When the encapsulating member is the opposite substrate, the encapsulating member may be a substrate including the same material as that of the base substrate.

The panel frame 120 may include an upper frame 121 and a lower frame 122 supporting the display panel 110 at upper and lower sides, and a connecting frame 123 connecting the upper frame 121 and the lower frame 122. All of the upper frame 121, the lower frame 122, and the connecting frame 123 may have a ring shape, of which a center is opened.

Outer circumferential diameters of the upper frame 121 and the lower frame 122 may be larger than a diameter of an outer circumference of the connecting frame 123 to form a guide recess 124. Inner circumferential diameters of the upper frame 121 and the lower frame 122 may be smaller than a diameter of an inner circumference of the connecting frame 123 to form a groove 125.

The upper frame 121 may be exposed to the outside of the smart watch, and a first reference point 120R may be disposed on the exposed surface of the upper frame 121. The first reference point 120R may determine a reference position of the display unit 100.

The display panel 110 may be inserted into and fixed to the groove 125 defined by an area among an inner surface of the connecting frame 123, the upper frame 121 and the lower frame 122. A part of the support frame 200 may be inserted into the guide recess 124 defined by an area among an external surface of the connecting frame 123, the upper frame 121 and the lower frame 122. For example, the area between the upper frame 121 and the lower frame 122 in a direction of the external surface of the connecting frame 123 may form the guide recess 124 guiding a rotation of the display unit 100.

The lower frame 122 may include a plurality of protrusions 122a disposed on a lower surface of the lower frame 122. The protrusions 122a may be spaced apart from each other along an edge of the lower frame 122.

The support frame 200 may accommodate the rotating member 300, the sensing unit 500 and the control unit 600. Further, the support frame 200 may be coupled with the display unit 100.

The support frame 200 may include a bottom surface 210, a lateral surface 220, an upper surface 230 and a band coupling part 240. The rotating member 300, the sensing unit 500, and the control unit 600 may be disposed on the bottom surface 210. The lateral surface 220 may be extended from the bottom surface 210 and bent or turned toward the upper side, for example, in a direction of the display unit 100. The upper surface 230 may be extended from the lateral surface 220 and bent or turned to be in parallel to the bottom surface 210. The band coupling part 240 may be coupled with the band member 400 at an external side of the lateral surface 220.

The bottom surface 210 may have a shape corresponding to the shape of the display panel 110. For example, when the display panel 110 has a circular shape, the bottom surface 210 may also have a circular shape. An area of the bottom surface 210 may be larger than an area of the display panel 110.

A second reference point 200R may be disposed on an exposed surface of the upper surface 230. The second reference point 200R may determine a reference position of the display unit 100 together with the first reference point 120R. For example, a position of the first reference point 120R on a virtual line L1 connecting the center of the display panel 110 to the second reference point 200R may be the reference position of the display unit 100.

The upper surface 230 may be inserted into the area among the external surface of the connecting frame 123, the upper frame 121 and the lower frame 122. The upper surface 230 may include a guide protrusion 230a guiding a rotation of the display unit 100.

The rotating member 300 may rotate the display unit 100. The rotating member 300 may include a rotating plate 310, a rotating shaft 320 and a driving motor 330. The rotating plate 310 may have a shape like a circular plate. One end of the rotating shaft 320 may be coupled to a center of the rotating plate 310 and be capable of rotating the rotating plate 310. The driving motor 330 may be coupled with the other side of the rotating shaft 320 and be capable of rotating the rotating shaft 320.

A plurality of recesses 310a corresponding to the protrusions 122a may be disposed on an outer peripheral surface of the rotating plate 310. The protrusions 122a may be gear-coupled with the recesses 310a. The rotating member 300 may rotate the display unit 100 by the gear-coupling of the protrusions 122a and the recesses 310a.

Exemplary embodiments have been described as having the rotating member 300 inside the support member 200. In another implementation, a part of the rotating member 300, for example, the driving motor 330, may also be disposed outside the support frame 200.

The band member 400 may be coupled to the band coupling part 240, so that a user may put the smart watch on a wrist. The band member 400 may include a flexible material or a bendable material, for example.

The sensor unit 500 may sense a rotation of the display unit 100. The sensor unit 500 may measure a rotation quantity of the driving motor 330, and transmit the rotation quantity of the driving motor 330 to the control unit 600. Further, the sensor unit 500 may transmit information about a position relation between the first reference point 120R and the second reference point 200R to the control unit 600.

The control unit 600 may control the display panel 110 and the rotating member 300. For example, the control unit 600 may control that the display panel 110 displays the image and that the rotating member 300 rotates the display unit 100. Further, the control unit 600 may convert the rotation quantity of the driving motor 330 transmitted from the sensor unit 500 into a rotation quantity of the display unit 100.

The display panel 110 may be in an always-on state in order to provide time information to the user. The image provided to the user in the always-on state may contain time information. For example, the image may include image information such as first information describing a position of an hour marker for each hour, and second information describing a position of an hour hand and a minute hand of a current time. Further, the second information may also describe a position of a second hand of a current time.

The display panel 110 of the smart watch may always display the image, so that the pixels in the area of the display panel 110, in which the first information is displayed, may be degraded. Accordingly, prevention of the degradation of the pixels of the smart watch is desirable.

Hereinafter, a method of preventing the smart watch from being degraded will be described with reference to FIGS. 4 to 6 together with FIGS. 1 to 3.

Figure 4:
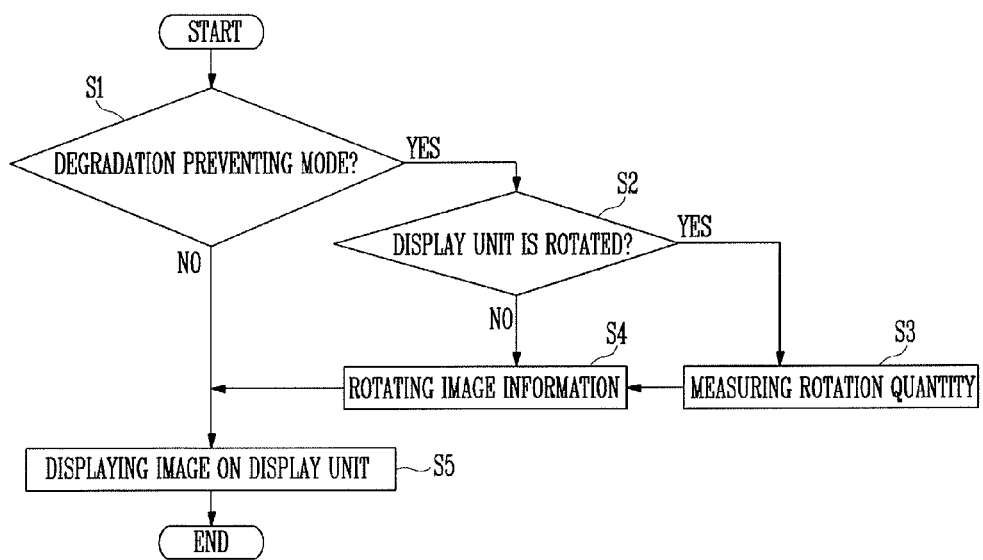
FIG. 4 illustrates a diagram for describing a method of preventing the smart watch illustrated in FIGS. 1 to 3 from being degraded.
Figure 5:
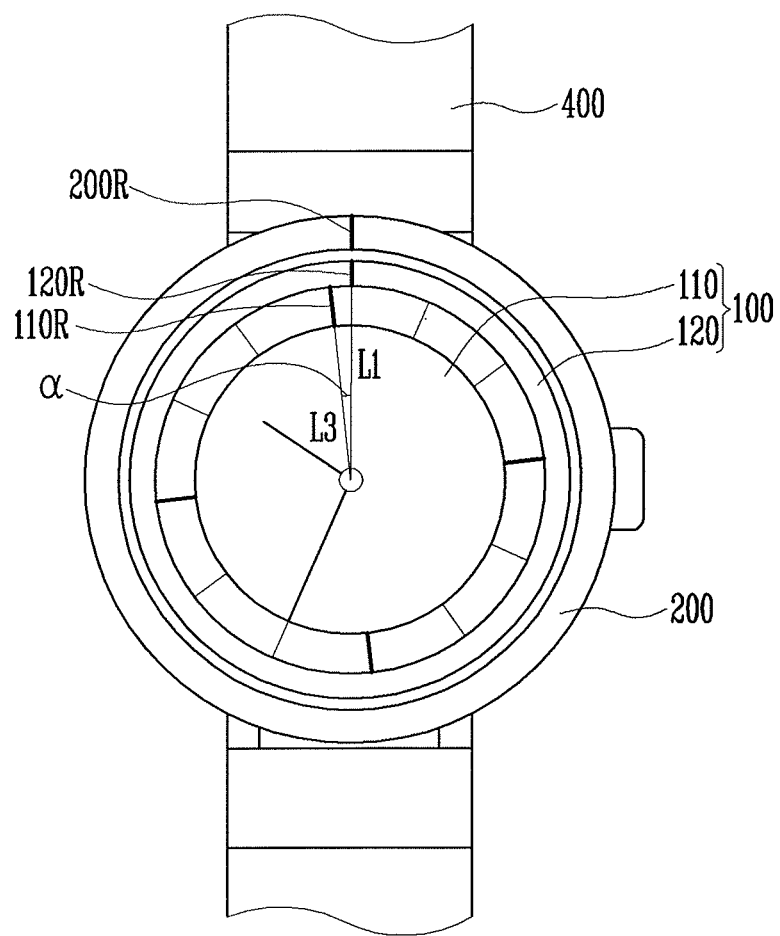
FIGS. 5 and 6 illustrate diagrams for describing an image displayed on the smart watch illustrated in FIGS. 1 to 3.
Figure 6:
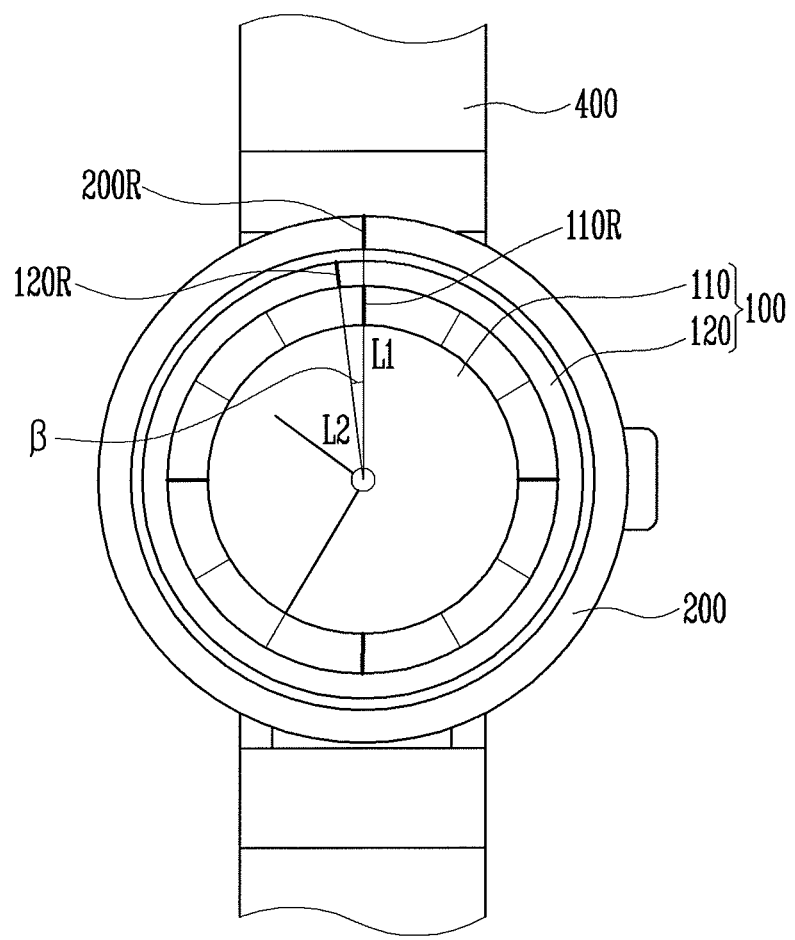

FIG. 4 is a diagram for describing a method of preventing the smart watch illustrated in FIGS. 1 to 3 from being degraded, and FIGS. 5 and 6 are diagrams for describing an image displayed on the smart watch illustrated in FIGS. 1 to 3.

Referring to FIGS. 1 to 6, the method of preventing the smart watch from being degraded may include an operation S1 of determining a degradation preventing mode, an operation S2 of determining a rotation of the display unit, an operation S3 of measuring a rotation quantity of the display unit, an operation S4 of rotating image information, and an operation S5 of displaying an image on the display unit.

In the operation S1 of determining the degradation preventing mode, the control unit 600 may determine whether the display unit 100 is set to be in the degradation preventing mode. The degradation preventing mode may be a mode for preventing a specific pixel in the display panel 110 of the display unit 100 from being degraded. Accordingly, the degradation preventing mode may be a mode for preventing an image quality of the display panel 110 from being degraded. The degradation preventing mode may be set by a selection of a user or an indication of the control unit 600.

When the display unit 100 is not set in the degradation preventing mode, the control unit 600 may maintain the always-on state of the display unit 100.

When the display unit 100 is set in the degradation preventing mode, the control unit 600 may determine a rotation of the display unit 100. For example, when the display unit 100 is set in the degradation preventing mode, the operation S2 of determining the rotation of the display unit may be executed.

The display unit 100 may be rotated by the rotating member 300. This will be described in more detail. In the degradation preventing mode, the control unit 600 may drive the rotating member 300 at a predetermined time period. The driving motor 330 of the rotating member 300 may be rotated by a signal transmitted from the control unit 600. When the driving motor 330 is rotated, the rotating shaft 320, of which one side is coupled to the driving motor 330, may be rotated. When the rotating shaft 320 is rotated, the rotating plate 310 coupled to the other side of the rotating shaft 320 may be rotated. The recesses 310a of the rotating plate 310 may be gear-coupled with the protrusions 122a of the panel frame 120, so that when the rotating plate 310 is rotated, the panel frame 120 may be rotated. Accordingly, the display unit 100 may be rotated.

When the display unit 100 is rotated, the first reference point 120R may be offset from a virtual line L1 connecting the center of the display panel 110 to the second reference point 200R.

The control unit 600 may determine whether the display unit 100 is rotated based on a rotation sensing signal of the sensor unit 500. The sensor unit 500 may sense the rotation of the driving motor 330 or recognize positions of the first reference point 120R and the second reference point 200R.

When the display unit 100 is rotated, the sensor unit 500 may generate the rotation sensing signal generated by sensing the rotation of the display unit 100, and transmit the rotation sensing signal to the control unit 600.

For example, when the driving motor 330 is operated to rotate the display unit 100, the sensor unit 500 generates the rotation sensing signal by sensing the rotation of the driving motor 330. The sensor unit 500 transmits the rotation sensing signal to the control unit 600. Accordingly, the control unit 600 may determine that the display unit 100 is rotated.

Further, when the first reference point 120R is spaced apart from the virtual line L1 connecting the center of the display panel 110 to the second reference point 200R, the sensor unit 500 may generate the rotation sensing signal. The sensor unit 500 may transmit the rotation sensing signal to the control unit 600. Accordingly, the control unit 600 may determine that the display unit 100 is rotated.

When the driving motor 330 is not driven, the display unit 100 is not rotated. The sensor unit 500 does not sense the rotation of the driving motor 330, and the sensor unit 500 does not transmit the rotation sensing signal to the control unit 600. Accordingly, the control unit 600 may determine that the display unit 100 is not rotated.

Further, when the first reference point 120R is positioned on the virtual line L1 connecting the center of the display panel 110 to the second reference point 200R, the sensor unit 500 cannot sense the rotation of the display unit 100. Accordingly, the control unit 600 cannot receive the rotation sensing signal from the sensor unit 500, and the control unit 600 may determine that the display unit 100 is not rotated.

When the control unit 600 determines that the display unit 100 is rotated, the control unit 600 may measure a rotation quantity of the display unit 100. For example, when the control unit 600 determines that the display unit 100 is rotated, the operation S3 of measuring the rotation quantity of the display unit 100 may be executed.

The rotation quantity of the display unit 100 may be measured by the sensor unit 500. For example, the sensor unit 500 may sense a rotation quantity of the driving motor 330. The sensor unit 500 may transmit the rotation quantity of the driving motor 330 to the control unit 600, and the control unit 600 may convert the rotation quantity of the driving motor 330 into a rotation quantity of the display unit 100.

Further, the sensor unit 500 may sense a first angle $\beta$ between the virtual line L1 connecting the center of the display panel 110 to the second reference point 200R and a virtual line L2 connecting the center of the display panel 110 to the first reference point 120R. The sensor unit 500 may transmit the first angle $\beta$ as the rotation quantity of the display unit 100.

In the operation S4 of rotating the image information, the control unit 600 rotates the first information, for example.

First, when the display unit 100 is not rotated, as illustrated in FIG. 5, the control unit 600 may rotate the image in order to prevent the display panel 110 from being degraded. For example, the control unit 600 may rotate the first information by a second angle $\alpha$ between the virtual line L1 connecting the center of the display panel 110 to the second reference point 200R and a virtual line L3 connecting the center of the display panel 110 to a first information reference point 110R based on the center of the display unit 100 as a rotation center.

Further, when the display unit 100 is rotated, the control unit 600 may rotate the first information in order to prevent the display panel 110 from being degraded. For example, as illustrated in FIG. 6, the control unit 600 may rotate the first information by the first angle $\beta$ in a direction opposite to the rotation direction of the display unit 100.

In the operation S5 of displaying the image on the display unit, the control unit 600 may enable the display unit 100 to display the image.

First, when the display unit 100 is not set in the degradation preventing mode, as illustrated in FIG. 1, the control unit 600 may display the same image as that of the image in the always-on state on the display panel 110. Further, the control unit 600 does not rotate the always-on state image, so that the control unit 600 enables the display panel 110 to display an image disposed so that an hour marker position at 12 o'clock sharp in the first information is positioned on the virtual line L1 connecting the center of the display panel 110 to the second reference point 200R. Further, the control unit 600 does not rotate the display unit 100, the first reference point 120R is positioned on the virtual line L1 connecting the center of the display panel 110 to the second reference point 200R.

When the display unit 100 is set in the degradation preventing mode, and the display panel 110 is not rotated, as illustrated in FIG. 5, the control unit 600 may enable the display panel 110 to display an image. The display image may display the first information rotated by the second angle $\alpha$ between the virtual line L1 connecting the center of the display panel 110 to the second reference point 200R and the virtual line L3 connecting the center of the display panel 110 to the first information reference point 110R. For example, the control unit 600 may enable the display panel 110 to display an image, in which an hour hand position at 12 o'clock sharp in the second information is positioned while being spaced apart from the virtual line L1 connecting the center of the display panel 110 to the second reference point 200R.

When the display unit 100 is set in the degradation preventing mode, and the display panel 110 is rotated, as illustrated in FIG. 6, the control unit 600 may enable the display panel 110 to display an image, in which the second information is rotated by the first angle $\beta$ in the direction opposite to the rotation direction of the display unit 100. For example, the control unit 600 may enable the display panel 110 to display the image, in which an hour hand position at 12 o'clock sharp in the second information is disposed on the virtual line L1 connecting the center of the display panel 110 to the second reference point 200R. Accordingly, the user may view the same image as the always-on state image.

The smart watch may rotate the second information in the degradation preventing mode. For example, the pixels displaying the second information may be changed according to a time in the display panel 110. Accordingly, the smart watch may prevent the display panel 110 from being degraded.

By way of summation and review, a display panel of the smart watch may be in a state of always displaying an image in order to provide time information to a user. When the display panel always displays the image, some pixels of the display panel may be degraded, e.g., by burning of the image or a portion thereof.

Exemplary embodiments may provide a smart watch, which is capable of preventing pixels of a display panel from being degraded, and may provide a method of preventing the smart watch from being degraded.

Embodiments may also provide an electronic device having a display unit including a display panel therein, e.g., an LCD panel, OLED panel, etc., and having a support frame. The display unit may be rotatable relative to the support frame.

The device of the exemplary embodiments may display time information using one or more images, e.g., hour, minute, and/or second hands which move relative to stationary indicators such as Arabic or Roman numeral hour markers, or text information.

The frame may have a predetermined orientation relative to a user and may include or be attached to a wrist strap, for example. The display unit may be physically rotatable relative to the wrist strap. Further, a rotating member such as a gear and motor assembly, MEMS or piezoelectric driver, etc., may be included in the device to rotate the display unit relative to the support frame.

The smart watch of the exemplary embodiments may prevent the pixels of the display panel from being degraded by using the disclosed degradation preventing mode.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A smart watch, comprising:
a display unit including a display panel displaying an image and a panel frame supporting the display panel;
a rotating member including a rotating plate provided with recesses on an outer peripheral surface of the rotating plate, a rotating shaft having one end connected to a center of the rotating plate to rotate the rotating plate, and a driving motor coupled with the other end of the rotating shaft;
a control unit to control the display unit and the rotating member; and
a support frame to support the display unit and accommodate the rotating member and the control unit, wherein:
the panel frame includes an upper frame and a lower frame supporting the display panel at upper and lower sides of the display panel, a connecting frame connecting the upper frame and the lower frame, and a plurality of protrusions on a lower surface of the lower frame and gear-coupled with the recesses,
the display panel is inserted into and fixed to a groove formed by an inner surface of the connecting frame, the upper frame, and the lower frame, and
the support frame includes a bottom surface, a lateral surface extended from the bottom surface and to an upper side, and an upper surface extended from the lateral surface and in parallel with the bottom surface, the rotating member and the control unit are located on the bottom surface, and the upper surface is inserted into a guide recess formed by an external surface of the connecting frame, the upper frame, and the lower frame.

2. The smart watch as claimed in claim 1, wherein the display panel has a circular shape.

3. The smart watch as claimed in claim 2, wherein the upper frame, the lower frame, and the connecting frame have ring-shapes, diameters of outer circumferences of the upper frame and the lower frame are larger than a diameter of an outer circumference of the connecting frame, and diameters of inner circumferences of the upper frame and the lower frame are smaller than a diameter of an inner circumference of the connecting frame.

4. The smart watch as claimed in claim 2, further comprising:
a first reference point on an exposed surface of the upper frame; and
a second reference point on an exposed surface of the upper surface, wherein the first and second reference points are for determining a reference position of the display unit.

5. The smart watch as claimed in claim 4, further comprising:
a sensor unit to sense a rotation of the display unit.

6. The smart watch as claimed in claim 5, wherein the sensor unit generates a rotation sensing signal by sensing a rotation of the driving motor and transmits the rotation sensing signal to the control unit.

7. The smart watch as claimed in claim 6, wherein the sensor unit senses a rotation quantity of the driving motor and transmits the rotation quantity of the driving motor to the control unit, and the control unit converts the rotation quantity of the driving motor into a rotation quantity of the display unit.

8. The smart watch as claimed in claim 5, wherein when the first reference point is spaced apart from a line connecting a center of the display panel to the second reference point, the sensor unit generates a rotation sensing signal and transmits the rotation sensing signal to the control unit.

9. The smart watch as claimed in claim 8, wherein the sensor unit transmits an angle between a line connecting the center of the display panel to the first reference point and the line connecting the center of the display panel to the second reference point to the control unit as a rotation quantity of the display unit.

10. The smart watch as claimed in claim 1, wherein the display panel is in an always-on state.

11. An electronic device, comprising:
a display unit including a display panel displaying an image and a panel frame supporting the display panel;
a rotating member to rotate the panel frame;
a control unit to control the display unit and the rotating member; and
a support frame to support the display unit and accommodate the rotating member and the control unit, wherein:
the panel frame includes an upper frame and a lower frame supporting the display panel at upper and lower sides of the display panel, and a connecting frame connecting the upper frame and the lower frame, the panel frame being rotatable relative to the support frame by the rotating member,
the display panel is inserted into and fixed to a groove formed by an inner surface of the connecting frame, the upper frame, and the lower frame, and
the support frame includes a bottom surface, a lateral surface extended from the bottom surface and to an upper side, and an upper surface extended from the lateral surface and in parallel with the bottom surface, the rotating member and the control unit are located on the bottom surface, and the upper surface is inserted into a guide recess formed by an external surface of the connecting frame, the upper frame, and the lower frame.

12. The electronic device as claimed in claim 11, wherein the rotating member includes a rotating plate provided with recesses on an outer peripheral surface of the rotating plate, a rotating shaft having one end connected to a center of the rotating plate to rotate the rotating plate, and a driving motor coupled with the other end of the rotating shaft, and the panel frame includes a plurality of protrusions on a lower surface of the lower frame and gear-coupled with the recesses.

* * * * *